March 16, 1943. L. G. FAIRHURST 2,314,136
AIRSCREW
Filed Jan. 28, 1942
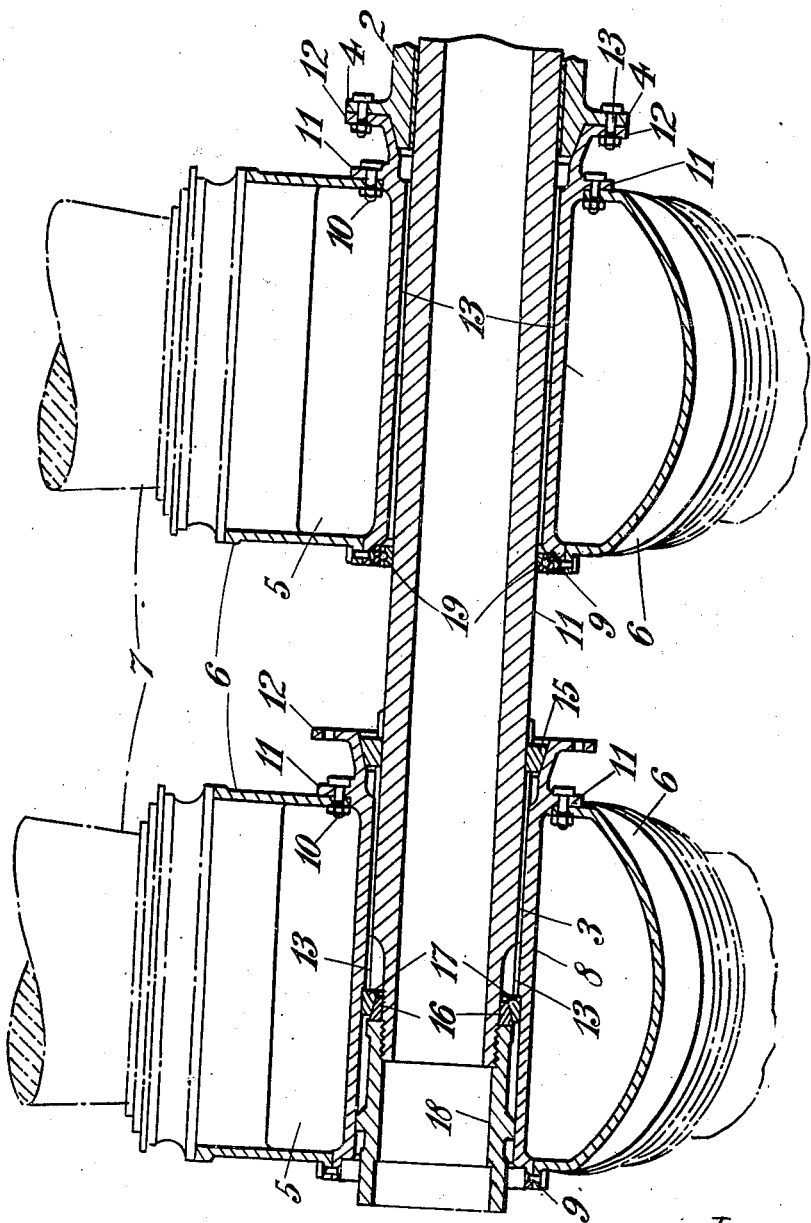
Inventor
Leonard G. Fairhurst
by Wilkinson & Mawhinney
Attorneys Patented Mar. 16, 1943

2,314,136

UNITED STATES PATENT OFFICE 2,314,136

AIRSCREW

Leonard Gaskell Fairhurst, Gloucester, England, assignor to Rotol Airscrews Limited, Gloucester, England, a company of Great Britain Application January 28, 1942, Serial No. 428,613
In Great Britain December 19, 1940

2 Claims. (Cl. 170—135.5)

This application corresponds to the application of Leonard Gaskell Fairhurst and Rotol Airscrews Limited, Serial No. 17,901/40, which was filed in Great Britain on December 19, 1940.

This invention concerns improvements in or relating to airscrews and has for its object to provide an improved construction of counter-rotating coaxial airscrews. It is the usual practice to mount an airscrew on its shaft by means of axial splines, in the hub engaging with axial splines on the shaft, but in the case of coaxial counter-rotating airscrews, the shaft of the airscrew nearer the engine (hereinafter called "the rear airscrew") has to surround the shaft of the other, or front, airscrew, and the consequent larger diameter of this shaft involves an increase in the size of the hub of the rear airscrew, so that it is heavier and, moreover, the two hubs cannot be similar to one another.

According to this invention, the shaft for the rear airscrew in a coaxial airscrew installation is provided with a radial flange, and the hub of the rear airscrew is secured to and driven by said flange.

With this construction the shaft for the rear airscrew can terminate at the flange, with the airscrew overhanging from it, and only the shaft for the front airscrew need extend through this hub. This hub can, therefore, be of the same size as that of the front airscrew which is mounted on the shaft. It may be possible in some cases with such an arrangement to reduce the overall length of the two airscrews, thereby reducing the overhang of the front airscrew, but the main advantage is that the two hubs may be similar as to their general dimensions and may, if desired, be made interchangeable since each of the hubs can be arranged to be mounted either by internal splines on a shaft or to be mounted on a flange as aforesaid.

A construction in accordance with this invention will now be described, by way of example only, with reference to the accompanying drawing which is a section through the hubs and shafts of a pair of counter-rotating airscrews on a plane containing the axes of the shafts.

The front airscrew, that is the airscrew further from the engine, is driven by a tubular shaft 1 which is nested within a second tubular shaft 2 that drives the rear airscrew. The shaft 1 is formed with splines 3 that stand proud of its outer surface while the shaft 2 is formed with a radial flange 4 at its front end. The shafts 1 and 2 are driven in opposite directions.

Each airscrew comprises a hub 5 formed with three sockets 6 to receive airscrew blades 7 and a driving sleeve 8 which is bolted to the hub 5 at its front end by radial bolts 9 and at its rear end by axially disposed bolts 10 passing through a radial flange 11 on the sleeve. Each sleeve is formed with a radial flange 12 and splines 13. The hubs 5 and sleeves 8 are identical but the airscrew blades will, of course, be selected for each airscrew to suit the direction of rotation of that airscrew. Each hub-sleeve assembly can, therefore, be used either for a front airscrew or for a rear airscrew. The airscrews shown are variable-pitch airscrews and the blades 7 are mounted, by means not shown, for rotation in the sockets 6 by pitch-varying mechanism which is not shown but which is accommodated in the hubs 5 and in, and in front of, the shafts 1 and 2.

The rear airscrew is mounted on its shaft 2 first by sliding it on the front end of the shaft 1 and then passing its splines 13 through the splines 3 of the shaft 1. Its flange 12 is then bolted to the flange 4 of the shaft 2 by nuts and bolts 14. A wedge-shaped split-ring 15 is then assembled in a groove cut in the splines 3 and the front airscrew is slid on the front end of the shaft 1 until an internal conical surface of the sleeve 8 abuts the ring 15. The front airscrew is retained on the shaft 1 by complementary wedging rings 16 and 17 and an internally threaded sleeve 18 which is screwed on to the end of the shaft 1.

If the two airscrews do not require to be interchangeable, the sleeves 8 may differ by the omission of the flange 12 from the sleeve 8 for the front airscrew and the omission of the splines 13 from the sleeve 8 for the rear airscrew. It will be understood that the hubs 6 remain identical and are each provided with the appropriate sleeve depending on whether it is to be used for a front or rear airscrew. This allows of an increase in the external diameter, and stiffness, of the shaft 1 rearwardly of its splined portion. Alternatively, a bearing 19 may be mounted on the shaft 1 and the sleeve 8 of the rear airscrew may rotate on this bearing. This also serves to stiffen the assembly.

It will be appreciated that the invention is also applicable to adjustable-pitch and fixed-pitch airscrews.

I claim:

1. A coaxial airscrew installation comprising two coaxial nested shafts of which the outer shaft is formed with a radial flange at its front end and the inner shaft projects beyond the front end of the outer shaft and is formed with splines on its front end and two airscrews which have identical hubs each hub having a splined through-way to engage the splines on the inner shaft and means for securing it to the flange on the outer shaft, and of which airscrews one has its hub secured to the flange of the outer shaft and located rearwardly of the splined portion of the inner shaft and the other has its hub secured on the splined portion of the inner shaft.

2. A coaxial airscrew installation comprising two coaxial nested shafts of which the outer shaft has a radial flange on its front end and the inner shaft projects beyond the front end of the outer shaft and has a splined portion at its front end separated from the front end of the outer shaft by a plain portion, a bearing on said plain portion of the inner shaft and two airscrews having identical hubs each formed with a splined throughway to fit the splined portion of the inner shaft and means for securing it to the flange of the outer shaft, one said hub being secured to the flange with the bearing located in the front end of throughway to support it on the inner shaft and the other said hub being secured on the splined portion of the inner shaft.

LEONARD GASKELL FAIRHURST.